(12) United States Patent
Goshen et al.

(10) Patent No.: US 10,825,469 B2
(45) Date of Patent: Nov. 3, 2020

(54) SYSTEM AND METHOD FOR VOICE ACTIVITY DETECTION AND GENERATION OF CHARACTERISTICS RESPECTIVE THEREOF

(71) Applicant: InSoundz Ltd., Tel Aviv (IL)

(72) Inventors: Tomer Goshen, Tel Aviv (IL); Emil Winebrand, Petach Tikva (IL); Tzahi Zilbershtein, Holon (IL); Matan Sagee, Givat Ela (IL); Guy Etgar, Tel Aviv (IL)

(73) Assignee: InSoundz Ltd., Tel Aviv (IL)

(*) Notice: Subject to any disclaimer, the term of this patent is extended or adjusted under 35 U.S.C. 154(b) by 218 days.

(21) Appl. No.: 16/039,987

(22) Filed: Jul. 19, 2018

(65) Prior Publication Data

US 2019/0027164 A1 Jan. 24, 2019

Related U.S. Application Data

(60) Provisional application No. 62/534,332, filed on Jul. 19, 2017.

(51) Int. Cl.
*G10L 25/57* (2013.01)
*G10L 25/78* (2013.01)
(Continued)

(52) U.S. Cl.
CPC ............. *G10L 25/78* (2013.01); *G01S 5/18* (2013.01); *G06F 17/142* (2013.01);
(Continued)

(58) Field of Classification Search
CPC ........... G10L 15/22; G10L 2015/223; G10L 2021/02166; G10L 21/0232; G10L 25/06; G10L 25/18; G10L 25/57; G10L 19/008; G10L 21/0208; G10L 21/0272; G10L 21/0216; G10L 25/84; G10L 25/78; G10L 25/81; G10L 19/26; G10L 25/93; G10H 1/0025; G10H 2210/125; G10H 2220/111; G10H 2240/075; G10H 2230/015; G10H 1/38; G10H 7/00; G10H 2210/081; G10H 2220/101; G10H 1/383; G10H 2210/066; G10H 2210/335; G10H 2230/031; G10H 2240/311; G10H 2220/126; G10H 2230/021; G10H 2240/305; G10H 2250/641; G10H 1/00; G10H 2210/005
See application file for complete search history.

(56) References Cited

U.S. PATENT DOCUMENTS

| | | |
|---|---|---|
| 2010/0280826 A1* | 11/2010 | Bakish ............... G01H 9/00 704/226 |
| 2016/0049150 A1* | 2/2016 | Nishikawa ........... G10L 15/22 704/275 |
| 2017/0061990 A1* | 3/2017 | Otani .................. H04N 5/9305 |

* cited by examiner

*Primary Examiner* — Huyen X Vo
(74) *Attorney, Agent, or Firm* — M&B IP Analysts, LLC (57) ABSTRACT

A system and method for analyzing sound signals within a predetermined space, including: analyzing a plurality of sound signals captured within a predetermined space via at least one sound sensor; generating a grid corresponding to the predetermined space based on the plurality of sound signals, wherein the grid is utilized to identify areas within the predetermined space as interest points; identifying, based on the interest point, at least one sound generating object within the grid based on the analysis of the plurality of sound signals; and identifying at least one characteristic of the plurality of sound signals.

19 Claims, 4 Drawing Sheets

(51) Int. Cl.
     *G10L 25/45*   (2013.01)
     *G06F 17/14*   (2006.01)
     *G10L 21/028*  (2013.01)
     *G01S 5/18*    (2006.01)
     *G10L 25/48*       (2013.01)
     *G10L 21/0216*     (2013.01)
     *G01S 3/802*       (2006.01)
(52) U.S. Cl.
     CPC ............ *G10L 21/028* (2013.01); *G10L 25/45* (2013.01); *G01S 3/802* (2013.01); *G10L 25/48* (2013.01); *G10L 2021/02166* (2013.01)

SYSTEM AND METHOD FOR VOICE ACTIVITY DETECTION AND GENERATION OF CHARACTERISTICS RESPECTIVE THEREOF

CROSS-REFERENCE TO RELATED APPLICATIONS

This application claims the benefit of U.S. Provisional Application No. 62/534,332 filed on Jul. 19, 2017, the contents of which are hereby incorporated by reference.

TECHNICAL FIELD

The present disclosure relates generally to sound capturing systems, and more specifically to sound capturing systems that analyze captured sound signals and generate characteristics based thereon.

BACKGROUND

Audio is an integral part of multimedia content, whether viewed on a television, a personal computing device, a projector, or any other of a variety of viewing means. The importance of audio becomes increasingly significant when the content includes multiple sub-events occurring concurrently. For example, while viewing a sporting event, many viewers appreciate the ability to listen to conversations occurring between players, instructions given by a coach, exchanges of words between a player and an umpire, and similar verbal communications, simultaneously with the audio of the event itself.

The obstacle with providing such simultaneous concurrent audio content is that currently available sound capturing devices, i.e., microphones, are unable to practically adjust to dynamic and intensive environments, such as, e.g., a sporting event. Many current audio systems struggle to track a single player or coach as that person moves through space, and falls short of adequately tracking multiple concurrent audio events.

One technique currently employed for tracking voices in a defined space is voice activity detection (VAD). This technique enables the detection of the presence or absence of human speech and is implemented and used in speech processing. The main applications of VAD are in speech coding and speech recognition, where VAD facilitates speech processing, and where it can also be used to deactivate some processes during non-speech sections of an audio session. This avoids unnecessary coding or transmission of silence packets in voice over internet protocol applications, economizing available processing power and network bandwidth.

As VAD is an important enabling technology for a variety of speech-based applications, various VAD algorithms have been developed that provide varying features and compromises between latency, sensitivity, accuracy and computational cost. Some VAD algorithms also provide further analysis, such as whether the speech is voiced, unvoiced or sustained. Voice activity detection is usually language independent. However, current VAD enables only a single dimension processing of audio and therefore, the output is limited by nature. Further, current VAD implementations are limited in the ability to track multiple concurrent sound sources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for analyzing sound signals within a predetermined space. The method includes: analyzing a plurality of sound signals captured within a predetermined space via at least one sound sensor; generating a grid corresponding to the predetermined space based on the plurality of sound signals, wherein the grid is utilized to identify areas within the predetermined space as interest points; identifying, based on the interest point, at least one sound generating object within the grid based on the analysis of the plurality of sound signals; and identifying at least one characteristic of the plurality of sound signals.

Certain embodiments disclosed herein also include a non-transitory computer readable medium having stored thereon instructions for causing a processing circuitry to perform a process, the process including: analyzing a plurality of sound signals captured within a predetermined space via at least one sound sensor; generating a grid corresponding to the predetermined space based on the plurality of sound signals, wherein the grid is utilized to identify areas within the predetermined space as interest points; identifying, based on the interest point, at least one sound generating object within the grid based on the analysis of the plurality of sound signals; and identifying at least one characteristic of the plurality of sound signals.

Certain embodiments disclosed herein also include a system for analyzing sound signals within a predetermined space, including: a processing circuitry; and a memory, the memory containing instructions that, when executed by the processing circuitry, configure the system to: analyze a plurality of sound signals captured within a predetermined space via at least one sound sensor; generate a grid corresponding to the predetermined space based on the plurality of sound signals, wherein the grid is utilized to identify areas within the predetermined space as interest points; identify, based on the interest point, at least one sound generating object within the grid based on the analysis of the plurality of sound signals; and identify at least one characteristic of the plurality of sound signals

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for capturing audio in the confinement of a predetermined space and identifying characteristics of the captured audio. The system includes an array of microphones that captures a plurality of sound signals at various points. The plurality of sound signals is projected onto a grid corresponding to the predetermined space for identifying location pointers within the grid associated therewith. The captured plurality of sounds is analyzed by the system. Based on the analysis, one or more characteristics related to each of the plurality of sounds are generated. The characteristics may include, for example, a source of the source signal, a type of sound signal, an angle of a sound source relative to a reference point, location pointers within the grid, time pointers, a signal to noise ratio, and a volume level, and the like. These characteristics may be used for a variety of applications, including identifying and tracking a sound generating object within a space.

Figure 1:
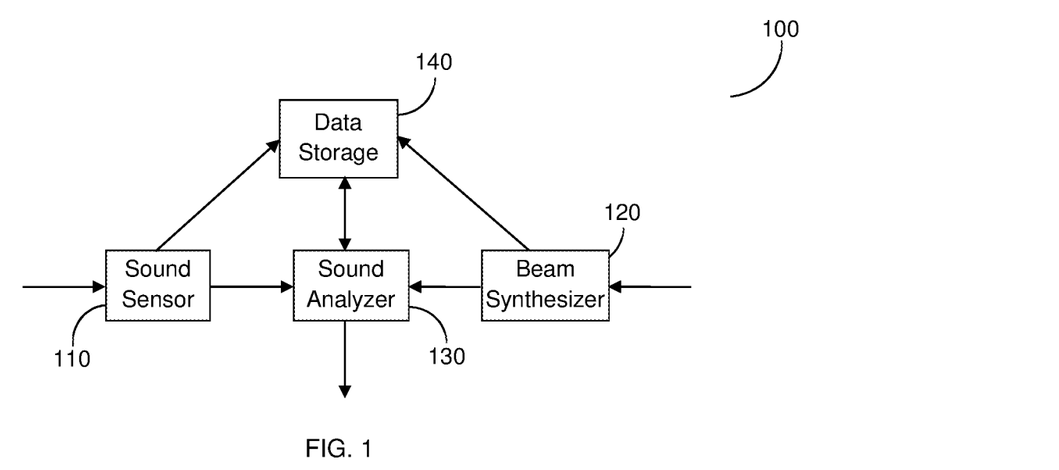
FIG. 1 is a block diagram of a system for voice activity detection and generation of characteristics respective thereof according to an embodiment.

FIG. 1 is a block diagram of a sound processing system 100 for voice activity detection and generation of characteristics according to an embodiment. The system 100 includes at least one sound sensor 110 with a plurality of microphones (not shown) configured to capture a plurality of sound signals within a predetermined space. The sound signals may be captured from a plurality of non-manipulated sound beams generated within the predetermined space.

In an embodiment, the sound processing system 100 further includes storage in the form of a data storage unit 140 or a database (not shown) for storing, for example, one or more definitions of sound beams, metadata, information from filters, raw data (e.g., sound signals), and/or other information captured by the sound sensor 110. The storage may be magnetic storage, optical storage, and the like, and may be realized, for example, as hard-drives, SSD, flash memory or other memory technology, CD-ROM, Digital Versatile Disks (DVDs), or any other medium which can be used to store the desired information.

The filters include circuits working within the audio frequency range and are used to process the raw data captured by the sound sensor 110. The filters may be preconfigured, or may be dynamically adjusted with respect to the received metadata.

In various embodiments, one or more of the sound sensor 110, a sound analyzer 120, and a beam synthesizer 130 may be coupled to the data storage unit 140. In another embodiment, the sound processing system 100 may further include a control unit (not shown) connected to the beam synthesizer unit 120. The control unit may further include a user interface that allows a user to track a sound generation object (SGO), as described herein below.

According to an embodiment, a plurality of sound signals generated within a predetermined space, such as a sports field, a public court, a venue, a stadium, and the like, are captured by the sound sensor 110 over a period of time and analyzed. The sound signals may include, for example, voices, speech, ambient noise, music, and the like. The sound sensor 110 is configured to collect sound signals throughout the predetermined space. According to an embodiment, metadata associated with each sound signal may further be captured by the sound sensor 110. Metadata may include time of capture, sound source angle or position relative to a reference point, length of sound signal, volume or amplitude of the sound signal, and the like.

Thereafter, the beam synthesizer 120 projects the captured sound signals onto a grid corresponding to the predetermined space. In an embodiment, the grid is generated by the system 100. The grid is adaptive through time and configured to enable characterization of the captured sound signals, as further described herein below. According to an embodiment, the grid may be used for identification of interest points within the predetermined space. As a non-limiting example, upon identification of a plurality of sound signals captured from a certain position within the grid, the position may be determined to be an interest point. As a non-limiting example of this embodiment, in a basketball game, the area near the basket where a plurality of sound interaction above a certain threshold are identified may be determined to be an interest point.

Following the projection of the sound signals on the grid, the sound signals are analyzed by the sound analyzer 130. The analysis may include one or more beamforming techniques, which includes directional focusing of the signals. In an embodiment, the analysis is performed in a time domain. According to this embodiment, an extracted filter is applied to each sound signal. The filter may be applied by a synthesis unit, and the filtered signals may be summed to a single signal by, e.g., the synthesis unit, such as the beam synthesizer 120.

In another embodiment, the analysis is performed in the frequency domain in which the received sound signal is first segmented into segments. Each of the segments is transformed, e.g., by a one-dimensional fast Fourier transform (FFT) algorithm, or any other wavelet decomposition transformation. The transformed segments may be multiplied by predetermined weighted factors. The output is summed for each decomposition element and transformed by an inverse one-dimensional fast Fourier transform (IFFT) or any other wavelet reconstruction transformation.

According to one embodiment, the weighted factors are generated by a generalized side lobe canceller (GSC) algorithm. According to this embodiment, it is presumed that the direction of the sources from which the sounds are received, the direction of the desired signal, and the magnitudes of those sources are known. The weighted factors are generated by determining a unit gain in the direction of the desired signal source while minimizing the overall root mean square (RMS) noise power.

According to another embodiment, the weighted factors are generated by an adaptive method in which the noise strength impinging each microphone and the noise correlation between the microphones are tracked. In this embodiment, the direction of the desired signal source is received as an input. Based on the received parameters, the expectancy of the output noise is minimized while maintaining a unity gain in the direction of the desired signal. This process is performed separately for each sound interval.

Beamforming techniques, sound signal filters, and weighted factors are described further in the U.S. Pat. No. 9,788,108, assigned to the common assignee, which is hereby incorporated by reference.

Based on the analysis, one or more characteristics related to one or more of the plurality of sound signals are identified by the sound analyzer 130. The characteristics may include, for example, a source of the source signal, a type of sound signal, an angle of a sound source relative to a reference point, location pointers within the grid, time pointers, a signal to noise ratio, and a volume level, and the like. The source may include, for example, a human, e.g., a voice, an object, e.g., a basketball, an instrument, e.g., a drum, and the like. According to an embodiment, the system 100 may be configured to track the sound source, e.g., the SGO, within the grid through time and space, to allow for identification of the source while it is moving. The tracking may be subject to an interest score generated based on the analysis, where a higher interest score may indicate a subject that may be of more interest to users. The interest score may be based on source type, volume, activity rate over time, and the like.

Figure 2:
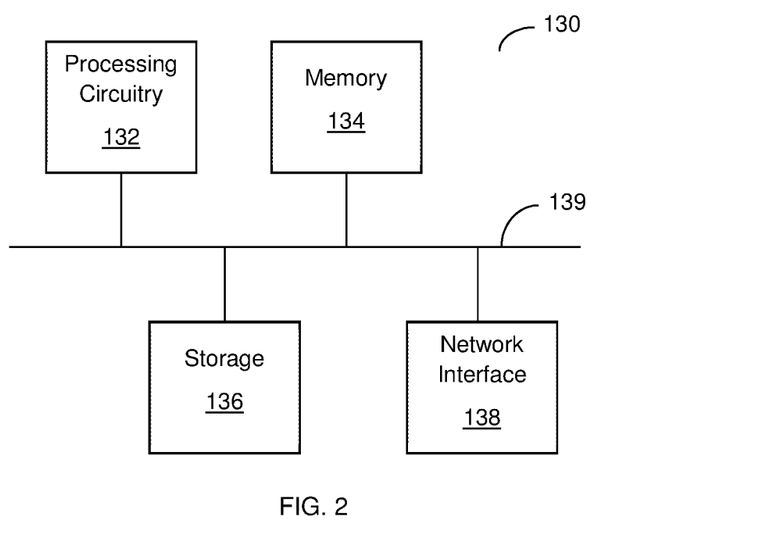
FIG. 2 is an example block diagram of the sound analyzer according to an embodiment.

FIG. 2 is an example block diagram of the sound analyzer 130 according to an embodiment. The sound analyzer 130 includes a processing circuitry 132 coupled to a memory 134, a storage 136, and a network interface 138. In an embodiment, the components of the sound analyzer 130 may be communicatively connected via a bus 139.

The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In another embodiment, the memory 134 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 132 to perform the sound analysis described herein.

The storage 136 may be magnetic storage, optical storage, and the like, and may be realized, for example, as flash memory or other memory technology, hard-drives, SSD, or any other medium which can be used to store the desired information. The storage 136 may store one or more sound signals, one or more grids associated with an area, interest points and the like.

The network interface 138 is configured to allow the control server 130 to communicate with the sound sensor 110 and the data storage 140, and the beam synthesizer 120. The network interface 138 may include, but is not limited to, a wired interface (e.g., an Ethernet port) or a wireless port (e.g., an 802.11 compliant WiFi card) configured to connect to a network (not shown).

Figure 3:
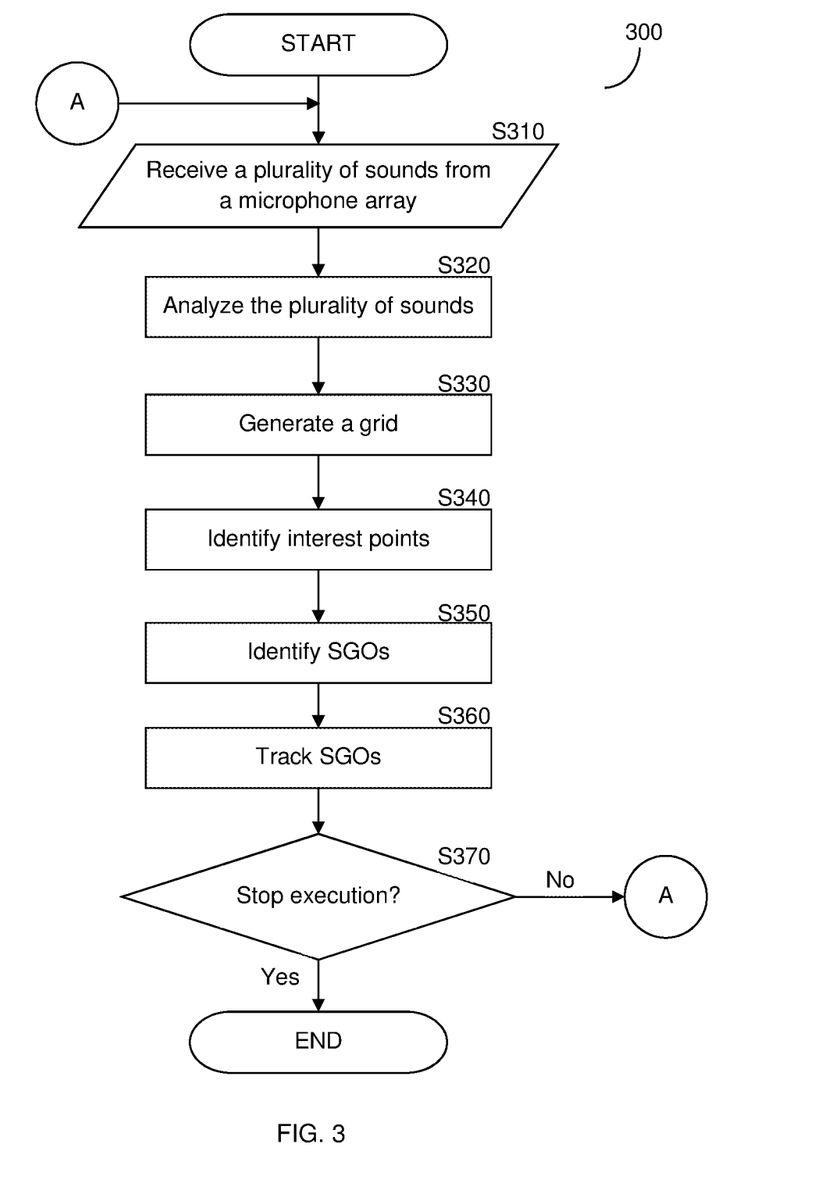
FIG. 3 is a flowchart of a method for tracking sound signals in a predetermined space according to an embodiment.

FIG. 3 is an example flowchart of a method 300 for tracking sound signals within a predetermined space according to an embodiment. In an embodiment, the sound signals are captured by a sound processing system, e.g., the system 100 of FIG. 1.

At S310, a plurality of sound signals is received from a recording source, such as from a microphone array via, for example, a sound sensor. The plurality of sound signals is captured in a predetermined space in proximity to the sound sensor.

At S320, the plurality of received sound signals are analyzed. In an embodiment, the analysis is performed in a time domain. The analysis may include applying a filter and applying one or more beamforming techniques to the sound signals. In an embodiment, the filter may be applied by a synthesis unit, and the filtered signals may be summed to a single signal by, e.g., the synthesis unit.

In another embodiment, the analysis is performed in the frequency domain in which the received plurality of sound signals is first segmented. In such an embodiment, each of the segments is transformed by, for example, a one-dimensional fast Fourier transform (FFT) or any other wavelet decomposition transformation. The transformed segments may be multiplied by predetermined weighted factors. The output is summed for each decomposition element and transformed by an inverse one-dimensional fast Fourier transform (IFFT) or any other wavelet reconstruction transformation.

At S330, a grid corresponding to the predetermined space is generated based on the captured sound signals. The grid is associated with the predetermined space, and used to identify areas within the predetermined space as interest points.

At S340, at least one interest point within the grid is identified based on the analysis of the sound signals. The identification of sound signals is further descried herein below with respect of FIGS. 5A and 5B.

At optional S350, sound generating objects (SGOs) associated with the sound signals are identified within the grid. SGOs may include individuals, objects, instruments, and the like. At S360, the identified SGOs are tracked within the grid to update any change of position. At S370, it is checked whether to stop the execution of the method and if so, execution terminates; otherwise, execution continues with S310.

Figure 4:
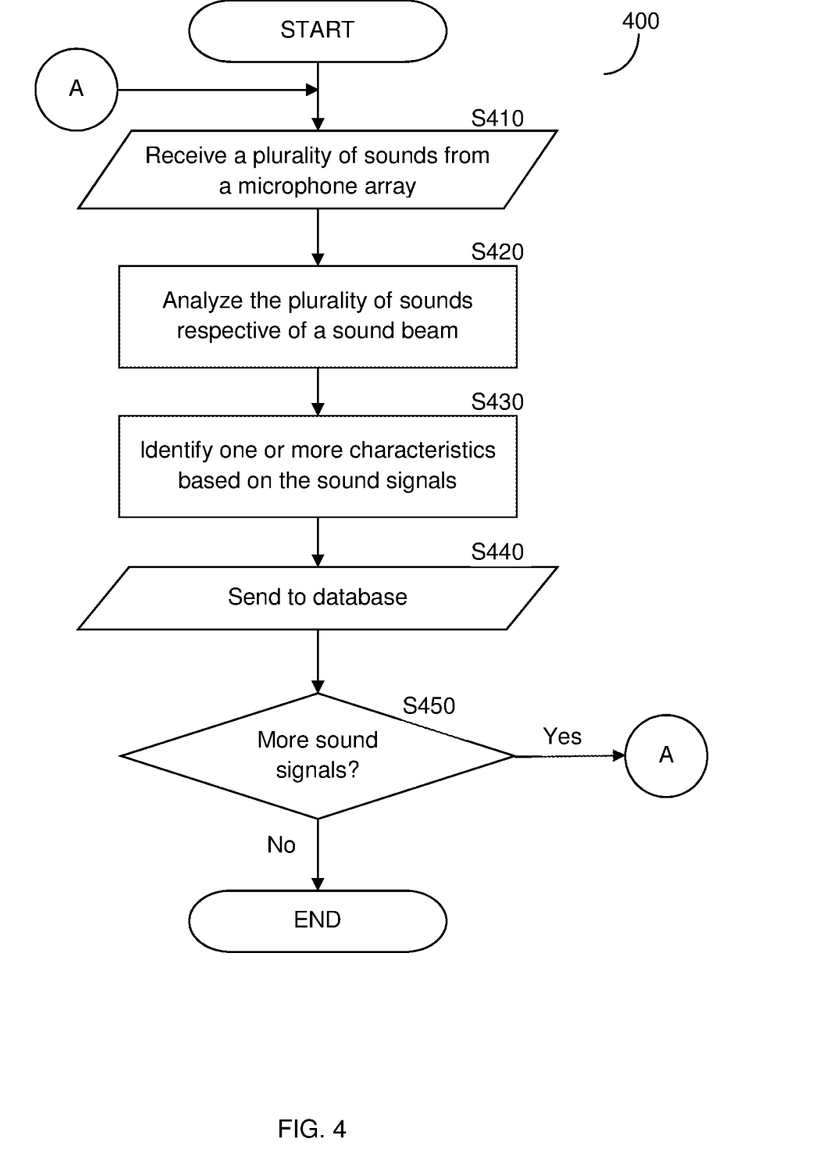
FIG. 4 is a flowchart of a method for identifying sound signal characteristics according to an embodiment.

FIG. 4 is an example flowchart describing a method 400 for generating characteristics based on a sound signal according to an embodiment. At S410, a plurality of sound signals is received, e.g., from a microphone array via a sound sensor. The plurality of sound signals that is received is generated within a predetermined space in proximity to the sound sensor.

At S420, the plurality of received sound signals are analyzed. In an embodiment, the analysis is performed in a time domain. According to this embodiment, an extracted filter is applied to each sound signal. The analysis may include analysis of each point in a grid based on a single channel soft voice activity detection (VAD). Thereafter, an identification of potential interest points within the grid based on the soft VAD is made. The analysis may include, for example, identification of a segmented signal to noise ratio (SNR) per point in the grid, probability of noise versus signal, a combination thereof, portions thereof, and the like. The analysis may further include generation of a central gravity or other weighting method for each point in the grid to determine the location of the SGO within the predetermined space along time.

In an embodiment, the filter may be applied by a synthesis unit. The filtered signals may be summed to a single signal by, e.g., the synthesis unit, such as the beam synthesizer 120 of FIG. 1. According to a further embodiment, the analysis may include projection of the captured sound signals onto a grid as further described hereinabove with respect to FIG. 3.

At S430, one or more characteristics are identified based on the plurality of sound signals. The characteristics may include, for example, a source of the source signal, a type of sound signal, an angle of a sound source relative to a reference point, location pointers within the grid, time pointers, a signal to noise ratio, and a volume level, and the like.

At optional S440, the generated characteristics are sent to a data storage unit for further use. The generated characteristics may be stored with identifying information, allowing the relationship between the characteristics and the underlying sound signal to be stored and accessed in the future if so desired. At S450, it is checked whether additional sound signals have been received and if so, execution continues with S410; otherwise, execution terminates.

It should be noted that the operation of a method for identifying interest points in a predetermined space according to an embodiment described hereinabove with respect to FIG. 3 and the operation of a method for generating characteristics based on sound signals according to an embodiment as described hereinabove with respect to FIG. 4 may be integrated without departing from the scope of the disclosure.

Figure 5A:
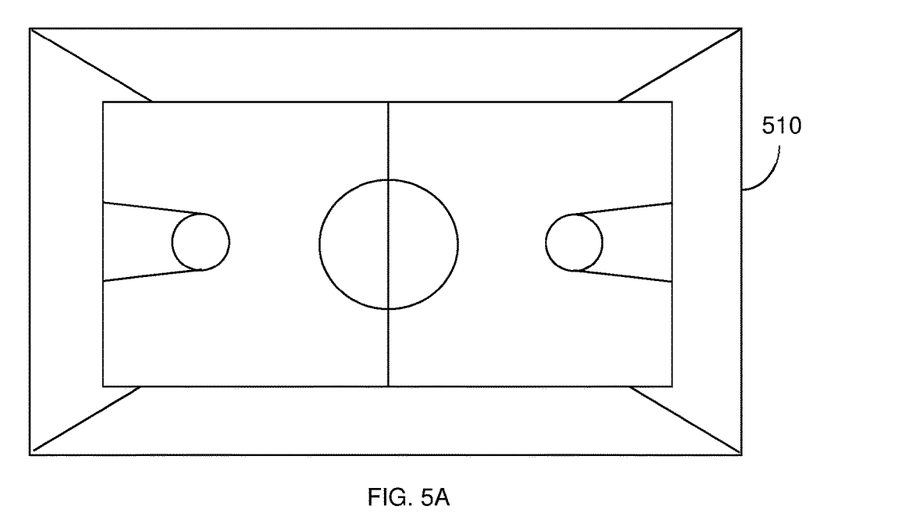
FIG. 5A is a schematic diagram of a predetermined space according to an embodiment.
Figure 5B:
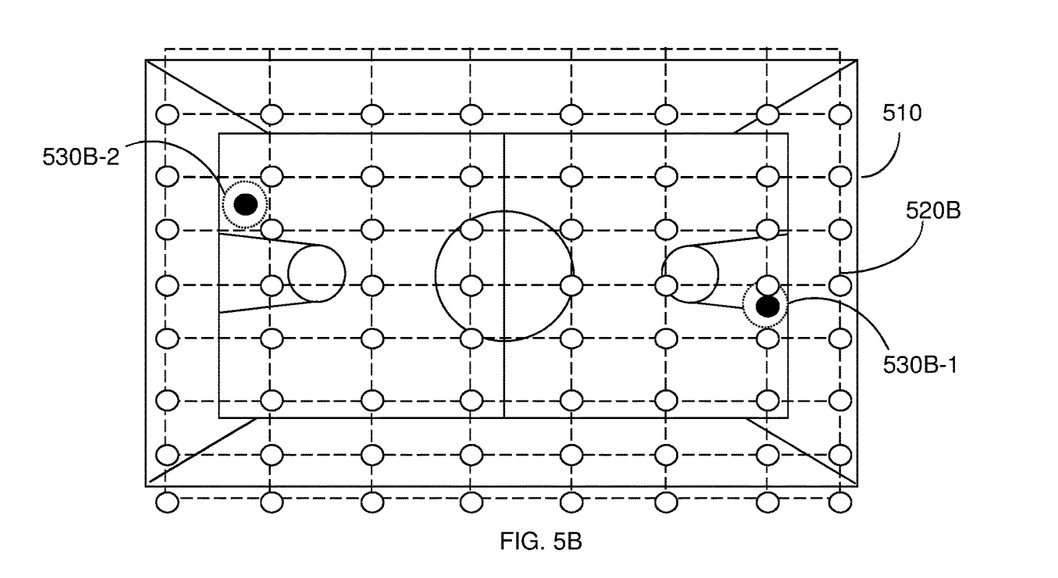
FIG. 5B is a schematic diagram of a generation and projection of a grid associated with a predetermined space according to an embodiment.

FIG. 5A is a schematic diagram of a basketball court 510 according to an embodiment, and FIG. 5B depicts an exemplary simulation of a grid projection 520B over the basketball court 510 according to an embodiment. Sound signals generated within the basketball court 510 are continuously monitored by the disclosed system. Interest areas 530B-1 and 530B-2 are identified based on an analysis of the sound signals as described above.

The generation of the grid 520B enables a system to follow SGOs automatically, within the predetermined space, i.e., the basketball court 510. The generation of the grid 520B further enables automatic synchronization and locking of sound signals generated by specific SGOs within the predetermined space and generation of analytics respective thereof.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for analyzing sound signals within a predetermined space, comprising:
analyzing a plurality of sound signals captured within a predetermined space via at least one sound sensor;
generating a grid corresponding to the predetermined space based on the plurality of sound signals;
analyzing each point in the grid based on a single channel soft voice activity detection (VAD), wherein the analyzing each point in the grid further comprises: identification of segmented signal to noise ratio per point in the grid and of a probability of noise versus signal;
identifying potential interest points within the grid based on the soft VAD, wherein the grid is utilized to identify areas within the predetermined space as interest points;
identifying, based on the interest point, at least one sound generating object within the grid based on the analysis of the plurality of sound signals; and
identifying at least one characteristic of the plurality of sound signals.

2. The method of claim 1, wherein the at least one characteristic includes at least one of: a source of the source signal, a type of sound signal, an angle of a sound source relative to a reference point, location pointers within the grid, time pointers, a signal to noise ratio, and a volume level.

3. The method of claim 1, further comprising:
tracking the sound generating object within the grid based on the identified characteristics.

4. The method of claim 1, wherein each of the plurality of sound signals is analyzed in a time domain.

5. The method of claim 1, wherein each of the plurality of sounds signals is analyzed in a frequency domain, and wherein the plurality of sound signals is segmented into segments.

6. The method of claim 5, wherein the segments of the plurality of sound signals are transformed by a fast Fourier transform algorithm.

7. The method of claim 1, wherein the analysis includes applying beamforming techniques to the sound signals.

8. The method of claim 1, wherein the at least one sound sensor is an array of microphones.

9. The method of claim 1, wherein the grid is adaptive through time.

10. A non-transitory computer readable medium having stored thereon instructions for causing a processing circuitry to perform a process, the process comprising:

analyzing a plurality of sound signals captured within a predetermined space via at least one sound sensor;

generating a grid corresponding to the predetermined space based on the plurality of sound signals;

analyzing each point in the grid based on a single channel soft voice activity detection (VAD), wherein the analyzing each point in the grid further comprises: identification of segmented signal to noise ratio per point in the grid and of a probability of noise versus signal;

identifying potential interest points within the grid based on the soft VAD, wherein the grid is utilized to identify areas within the predetermined space as interest points;

identifying, based on the interest point, at least one sound generating object within the grid based on the analysis of the plurality of sound signals; and identifying at least one characteristic of the plurality of sound signals.

11. A system for analyzing sound signals within a predetermined space, comprising:

a processing circuitry; and a memory, the memory containing instructions that, when executed by the processing circuitry, configure the system to:

analyze a plurality of sound signals captured within a predetermined space via at least one sound sensor;

generate a grid corresponding to the predetermined space based on the plurality of sound signals;

analyzing each point in the grid based on a single channel soft voice activity detection (VAD), wherein the analyzing each point in the grid further comprises: identification of segmented signal to noise ratio per point in the grid and of a probability of noise versus signal;

identifying potential interest points within the grid based on the soft VAD, wherein the grid is utilized to identify areas within the predetermined space as interest points;

identify, based on the interest point, at least one sound generating object within the grid based on the analysis of the plurality of sound signals; and identify at least one characteristic of the plurality of sound signals.

12. The system of claim 11, wherein the at least one characteristic includes at least one of: a source of the source signal, a type of sound signal, an angle of a sound source relative to a reference point, location pointers within the grid, time pointers, a signal to noise ratio, and a volume level.

13. The system of claim 11, wherein the system is further configured to:

track the sound generating object within the grid based on the identified characteristics.

14. The system of claim 11, wherein each of the plurality of sound signals is analyzed in a time domain.

15. The system of claim 11, wherein each of the plurality of sounds signals is analyzed in a frequency domain, and wherein the plurality of sound signals is segmented into segments.

16. The system of claim 15, wherein the segments of the plurality of sound signals are transformed by a fast Fourier transform algorithm.

17. The system of claim 11, wherein the analysis includes applying beamforming techniques to the sound signals.

18. The system of claim 11, wherein the at least one sound sensor is an array of microphones.

19. The system of claim 11, wherein the grid is adaptive through time.

* * * * *